United States Patent
Miyake et al.

(10) Patent No.: US 7,281,151 B2
(45) Date of Patent: Oct. 9, 2007

(54) METHOD OF STOPPING DATA COMMUNICATION OF A COMMUNICATION APPARATUS BASED ON A DETECTION OF A POWER SUPPLY VOLTAGE DROP

(75) Inventors: Makoto Miyake, Osaka (JP); Yoshihide Komatsu, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 427 days.

(21) Appl. No.: 10/715,432

(22) Filed: Nov. 19, 2003

(65) Prior Publication Data
US 2004/0153680 A1    Aug. 5, 2004

(30) Foreign Application Priority Data
Feb. 4, 2003    (JP)    ............... 2003-027289

(51) Int. Cl.
G06F 1/00    (2006.01)
(52) U.S. Cl. ............... 713/340; 713/300; 713/320
(58) Field of Classification Search ............... 713/300, 713/320, 324, 330, 340
See application file for complete search history.

(56) References Cited

U.S. PATENT DOCUMENTS

| | | | | |
|---|---|---|---|---|
| 5,444,862 A | * | 8/1995 | Hibino ............... | 455/504 |
| 5,805,666 A | * | 9/1998 | Ishizuka et al. ............... | 379/1.01 |
| 5,903,034 A | * | 5/1999 | Sakamoto et al. ............... | 257/379 |
| 6,124,700 A | * | 9/2000 | Nagai et al. ............... | 320/132 |
| 6,246,272 B1 | | 6/2001 | Takai | |
| 6,256,520 B1 | * | 7/2001 | Suzuki ............... | 455/572 |
| 6,362,467 B1 | * | 3/2002 | Bray ............... | 250/214 A |
| 6,418,550 B1 | | 7/2002 | Heinrich | |
| 6,804,789 B2 | * | 10/2004 | Shimizu ............... | 713/300 |
| 2001/0035793 A1 | * | 11/2001 | Watanabe ............... | 330/253 |
| 2001/0055986 A1 | * | 12/2001 | Odagiri ............... | 455/572 |
| 2002/0028701 A1 | * | 3/2002 | Satoh et al. ............... | 455/574 |
| 2002/0105818 A1 | * | 8/2002 | Yoshikawa et al. ............... | 363/85 |
| 2002/0142740 A1 | * | 10/2002 | Nitta ............... | 455/115 |
| 2002/0163384 A1 | * | 11/2002 | Hasegawa ............... | 330/258 |

FOREIGN PATENT DOCUMENTS

| | | |
|---|---|---|
| JP | 02-128533 | 5/1990 |
| JP | 11-027849 | 1/1999 |

* cited by examiner

*Primary Examiner*—Chun Cao
*Assistant Examiner*—Malcolm D Cribbs
(74) *Attorney, Agent, or Firm*—McDermott Will & Emery LLP (57) ABSTRACT

In data communication apparatus for communicating with another data communication apparatus via cables, when a power supply voltage applied to the data communication apparatus drops and the application of the power supply voltage is stopped, a power-supply-voltage-drop detecting circuit immediately detects the drop in the power supply voltage, thereby detecting the stop of application of the power supply voltage. When the stop of the power supply is detected, a stop signal outputting circuit outputs a communication stop signal to said another data communication apparatus. Accordingly, when power supply is stopped in one of the two pieces of data communication apparatus, it is possible to prevent a malfunction from occurring in the other data communication apparatus.

6 Claims, 8 Drawing Sheets

METHOD OF STOPPING DATA COMMUNICATION OF A COMMUNICATION APPARATUS BASED ON A DETECTION OF A POWER SUPPLY VOLTAGE DROP

BACKGROUND OF THE INVENTION

Figure 8A:
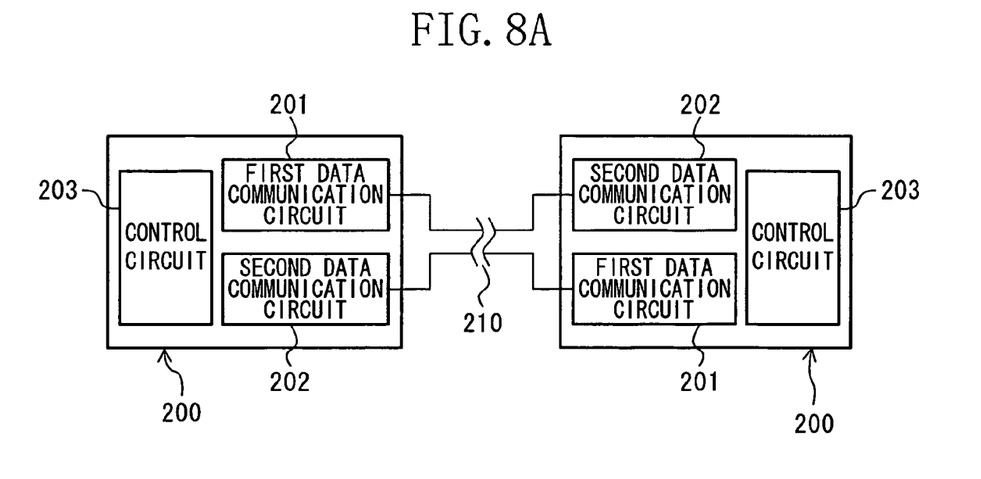
FIG. 8A is a diagram showing a whole configuration of a known data communication apparatus and FIG. 8B is a diagram showing a specific configuration of a main portion of the data communication apparatus.
Figure 8B:
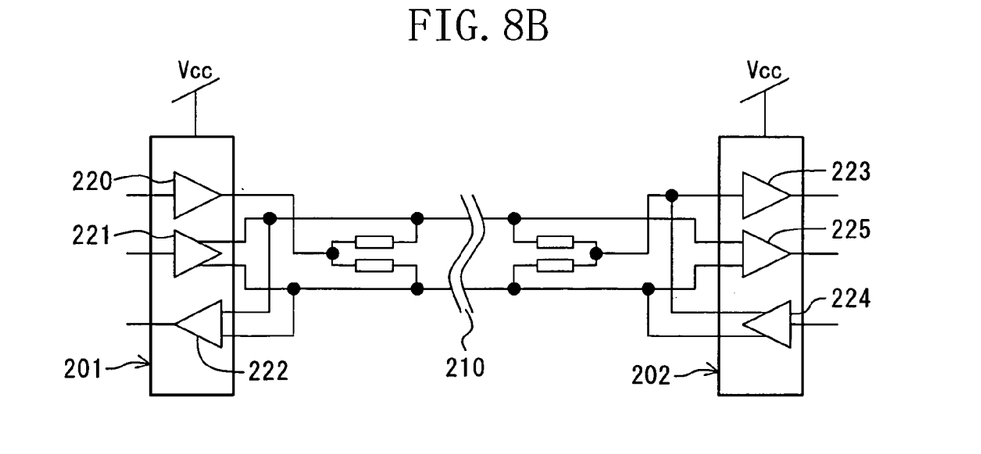

The present invention relates to data communication apparatus for data communication via cables and methods for the data communication Known data communication apparatus will be described using a serial interface based on IEEE Std 1394a-2000 for carrying out communication using a differential signal. FIGS. 8A and 8B respectively show known data communication apparatus 200 and connection configurations thereof.

In FIG. 8A, the data communication apparatus 200 is constituted by a first communication circuit 201, a second communication circuit 202 and a control circuit 203. The first communication circuit 201 is coupled to the second communication circuit 202 of the data communication apparatus 200 at the other end of the communication via a cable 210, thereby carrying out data communication.

FIG. 8B shows respective configurations of the first communication circuit 201 and the second communication circuit 202. The first communication circuit 201 includes: a common-mode-potential setting circuit 220 for setting a common-mode potential of a differential signal for use in data communication; a driver circuit 221 for transmitting data; and a receiver circuit 222 for receiving data. The second communication circuit 202 includes: a common-potential detecting circuit 223 for detecting the common potential; a driver circuit 224; and a receiver circuit 225.

Now, it will be described how the data communication apparatus 200 operates.

First, when the first communication circuit 201 is ready for communication, the common-mode-potential setting circuit 220 outputs a common-mode potential of a differential signal. This common-mode potential is detected by the common-mode-potential detecting circuit 223 of the second communication circuit 202, thereby initiating communication. Data transmitted from the driver circuit 221 of the first communication circuit 201 is received by the receiver circuit 225 of the second communication circuit 202, whereas data transmitted from the driver circuit 224 of the second communication circuit 202 is received by the receiver 222 of the first communication circuit 201. In this manner, bidirectional communication can be performed.

In the data communication apparatus 200, when application of a power supply voltage Vcc to the first communication circuit 201 is stopped, the functions of the driver circuit 221 and the receiver circuit 222 in the first communication circuit 201 stop, but the second communication circuit 202 continues transmission and reception, resulting in a malfunction occurring in the second communication circuit 202. The control circuit 203 in the data communication apparatus 200 detects this malfunction, thereby stopping communication between two pieces of communication apparatus 200 and 200. In the case where power supply to the second communication circuit 202 is stopped, the same operation as described above is performed. Such a technique is disclosed in Japanese Laid-Open Publication No. 2-128533, for example.

However, the known data communication apparatus 200 has a drawback because of the following configuration. In a period between a stop of power supply to one of the two pieces of data communication apparatus 200 and a stop of the communication, the second communication circuit 202 of the other piece of data communication apparatus 200 continues transmission and reception, and a malfunction occurs. Then, the stop of power supply is detected by detection of this malfunction. Therefore, in the known data communication apparatus 200, a malfunction in communication always occurs.

If the power supply to the control circuit 203 is stopped at the same time as a stop of power supply to the data communication apparatus 200, there arises a problem that it is difficult to detect a malfunction with the control circuit 203.

SUMMARY OF THE INVENTION

It is therefore an object of the present invention to provide a data communication apparatus which detects a stop of power supply without fail when power supply is stopped and which stops communication to the associated communication apparatus, without causing a malfunction.

In order to achieve this object, according to the present invention, a drop in a power supply voltage supplied is detected, thereby immediately detecting a stop of power supply before a malfunction occurs.

Specifically, the inventive data communication apparatus is used for data communication via cables, and the apparatus is characterized by including: a drop detecting circuit for detecting a drop in a power supply voltage supplied to the data communication apparatus; and a stop signal outputting circuit for outputting a communication stop signal via the cable, in response to a drop detection signal output from the drop detecting circuit.

The inventive data communication apparatus is characterized in that when the drop detecting circuit detects a drop in the power supply voltage, a communication circuit embedded in the data communication apparatus for data communication stops the function of the communication circuit in response to the drop detection signal output from the voltage-drop detecting circuit.

The inventive data communication apparatus is characterized by including a common-mode-potential setting circuit for setting a common-mode potential of a differential signal at the cables, wherein the stop signal outputting circuit decreases the common-mode potential set by the common-mode-potential setting circuit to a ground potential, thereby outputting a communication stop signal.

The inventive data communication apparatus is characterized in that the drop detecting circuit includes: a voltage converting circuit having an outputting voltage which varies depending on a drop in the power supply voltage; and a comparator for comparing a voltage variation signal output from the voltage converting circuit with a predetermined constant voltage value.

The inventive data communication apparatus is characterized in that the voltage converting circuit includes: a load circuit having a load resistance which varies depending on variation in the power supply voltage; and at least one resistance connected to the load circuit in series.

The inventive data communication apparatus is characterized in that the comparator includes: a differential amplifier for receiving the voltage variation signal output from the voltage converting circuit and a predetermined constant voltage value signal; and an inverter for receiving an output from the differential amplifier and inverting the output, and the inverter includes: a p-type transistor for receiving the output from the differential amplifier; and a resistance connected to the p-type transistor in series and having a high resistance value.

An inventive data communication method is a method for data communication via cables, and the method is characterized by including the steps of detecting a drop in a power supply voltage applied, thereby detecting a stop of the application of the power supply voltage; and decreasing a potential at the cables when detecting the stop of the application of the power supply voltage, thereby outputting a communication stop signal.

As described above, according to the present invention, in stopping application of a power supply voltage to a data communication apparatus, when detecting a drop in the power supply voltage, the drop detecting circuit determines the voltage drop as a stop of application of the power supply voltage, so that a stop signal outputting circuit outputs a communication stop signal. Accordingly, it is possible to immediately detect a stop of application of a power supply voltage at an early stage before a malfunction occurs in the data communication apparatus, as compared to the case where a stop of application of a power supply voltage is not determined until a malfunction is detected as in the known data communication apparatus.

In addition, detection of a drop in a power supply voltage and output of a communication stop signal are performed while the power supply voltage is dropping. Accordingly, the data communication apparatus can operate utilizing the dropping power supply voltage without requiring any additional power source for the drop detecting circuit and the stop signal outputting circuit.

DESCRIPTION OF THE PREFERRED EMBODIMENTS

Embodiment 1

Hereinafter, an embodiment of the present invention will be described with reference to the drawings.

Figure 1:
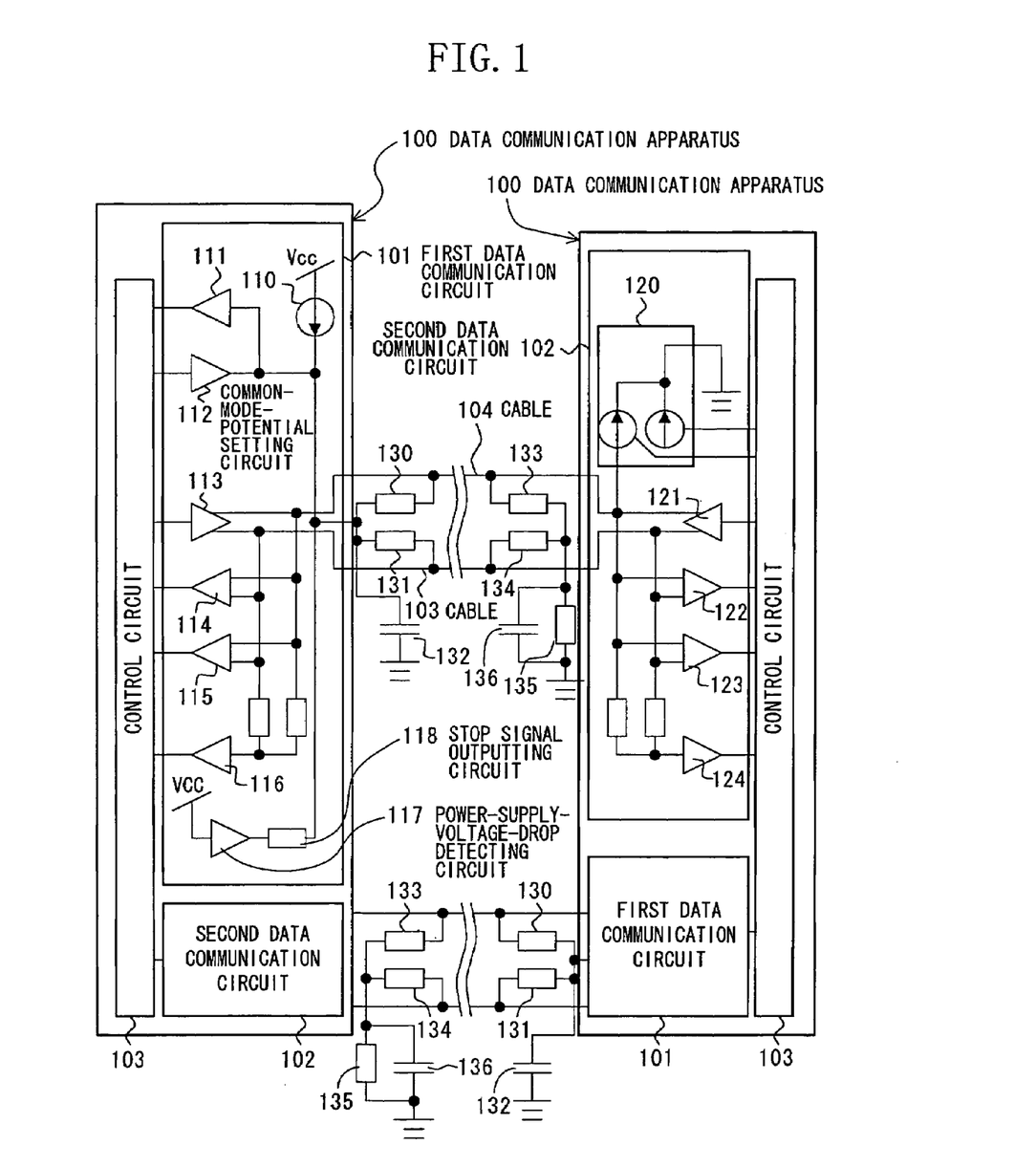
FIG. 1 is a diagram showing configurations of data communication apparatus according to an embodiment of the present invention and a configuration in which the two pieces of data communication apparatus are coupled via cables.

FIG. 1 is a diagram showing configurations of data communication apparatus 100 based on IEEE Std 1394a-2000, and a connection between the two pieces of data communication apparatus 100 and 100.

In FIG. 1, the data communication apparatus 100 includes: a first communication circuit 101; a second communication circuit 102; and a control circuit 103.

The first communication circuit 101 is coupled to the second communication circuit 102 at the other end of the communication via cables 103 and 104. The first communication circuit 101 includes: a current source 110; a connection detecting circuit 111 for detecting connection with the other end of the communication via the cables 103 and 104; a common-mode-potential setting circuit 112 for setting a common potential of a differential signal; a driver circuit 113 for transmitting data with a differential output; a receiver circuit 114 for receiving differential output data; an arbitration circuit 115 for use in securing a bus to which data is to be transmitted; and a communication speed detecting circuit 116 for detecting a communication speed specified by the other end of the communication.

As a feature of the present invention, the first communication circuit 101 further includes: a power-supply-voltage-drop detecting circuit 117: and a stop signal outputting circuit 118. The power-supply-voltage-drop detecting circuit 117 detects a drop in a power supply voltage Vcc applied to the data communication apparatus 100 in which the power-supply-voltage-drop detecting circuit 117 is provided, thereby detecting a stop of application of the power supply voltage Vcc to the apparatus. Upon receiving a drop detection signal from the power-supply-voltage-drop detecting circuit 117, the stop signal outputting circuit 118 notifies the data communication apparatus 100 at the other end of the communication of the communication stop signal indicating a stop of the communication. Inner configurations of these circuits 117 and 118 will be described later.

The second communication circuit 102 includes: a communication speed notifying circuit 120 for notifying the other end of the communication of a communication speed; a driver circuit 121 for transmitting a data signal; a receiver circuit 122 for receiving a data signal; an arbitration circuit 123 for use in securing a bus to which data is to be transmitted; and a common-mode-potential detecting circuit 124 for detecting whether or not a common-mode potential of a differential signal from the other end of the communication is set.

Resistances 130 and 131 for terminating a differential signal at a common-mode potential and a capacitance 132 for stabilizing the common-mode potential are provided between the first communication circuit 101 and the cable 103 or 104. Resistances 133 and 134 for terminating a differential signal at a common-mode potential, a resistance 135 for terminating the common-mode potential at a ground potential, and a capacitance 136 for stabilizing the common-mode potential are provided between the second communication circuit 102 and the cable 103 or 104.

Hereinafter, basic operation of the data communication apparatus 100 thus configured according to this embodiment will be described.

First, when data communication apparatus 100 is coupled to the other end of the communication via the cables 103 and 104, current from the current source 110 flows through the resistances 130, 133 and 135 and also flows through the resistances 131, 134 and 135. In this manner, the connection detecting circuit 111 detects connection with the other end of the communication. Then, when preparations for the communication is made, the common-mode-potential setting circuit 112 sets the common-mode potential, and the common-mode-potential detecting circuit 124 at the other end of the communication detects the setting. Thereafter, communication with a differential signal is initiated. In this communication, a bus is secured using the arbitration circuit 115 and the communication speed detecting circuit 123. The communication speed detection circuit 116 is notified of the setting of a communication speed from the communication speed notifying circuit 120. Data communication is carried out between the driver circuit 113 and the receiver circuit 122 and between the driver circuit 121 and the receiver circuit 114.

Figure 2:
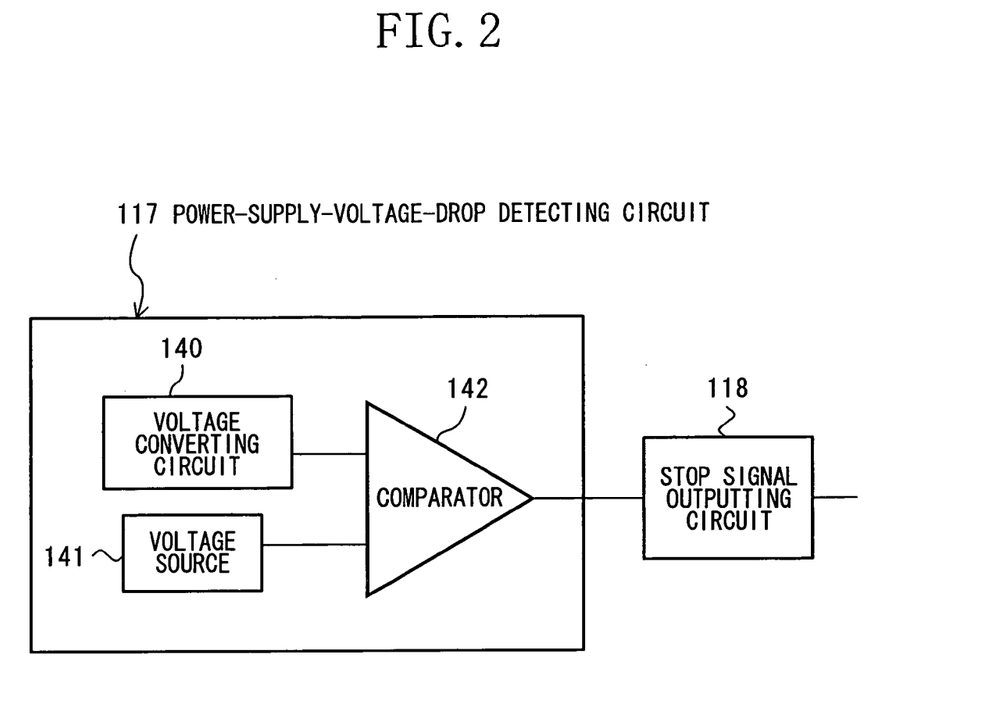
FIG. 2 is a diagram showing configurations of a power-supply-voltage-drop detecting circuit and a stop signal outputting circuit.

Next, FIG. 2 shows an internal configuration of the power-supply-voltage-drop detecting circuit 117 and the stop signal outputting circuit 118.

In FIG. 2, the power-supply-voltage-drop detecting circuit 117 includes: a voltage converting circuit 140; a voltage source 141; and a comparator 142. The voltage converting circuit 140 exhibits a characteristic of having an output voltage which decreases as the power supply voltage Vcc drops. The voltage source 141 outputs a constant voltage, irrespective of the drop in the power supply voltage Vcc. The comparator 142 makes a comparison between the output voltage of the voltage converting circuit 140 and the output voltage of the voltage source 141, thereby outputting a signal at an L-level if the output voltage of the voltage converting circuit 140 is higher than that of the voltage source 141, while outputting a signal at an H-level if the output voltage of the voltage converting circuit 140 is lower than that of the voltage source 141. If the output of the comparator 142 based on the voltage converting circuit 140 is at the H-level, a drop in the power supply voltage Vcc is detected, and a stop of application of the power supply voltage Vcc is detected, then the stop signal outputting circuit 118 forces the cables 103 and 104 to be grounded and decreases the common-mode potential set by the common-mode-potential setting circuit 112 to the ground potential, thereby outputting a communication stop signal.

Accordingly, in stopping the application of the power source voltage Vcc to the data communication apparatus 100 at the left side in FIG. 1, for example, the power supply voltage Vcc in this data communication apparatus 100 gradually drops, and the output voltage of the voltage converting circuit 140 monotonously decreases in accordance with this voltage drop. When the output voltage is lower than the constant voltage of the voltage source 141, the comparator 142 outputs an output signal at the H-level, thereby detecting a stop of application of the power supply voltage Vcc. Upon receiving the H-level signal from the comparator 142, the stop signal outputting circuit 118 decreases the common-mode potential at the cables 103 and 104 to a ground potential, so that the data communication apparatus 100 to which the application of the power supply voltage Vcc stops notifies the other end of the communication that no data communication can be carried out. Accordingly, the common-mode-potential detecting circuit 124 at the other end of the communication detects that the common-mode potential is decreased to the ground potential to recognize that no communication is carried out in the current state.

In decreasing the common-mode potential at the cables 103 and 104 to the ground potential, each of the common-mode-potential setting circuit (communication circuit) 112 and the driver circuit (communication circuit) 113, for example, receives a drop detection signal from the power-supply-voltage-drop detecting circuit 117, and stops the functions thereof This is because of the purpose of not having the circuits 112 and 113, for example, inhibit the decrease of the common-mode potential to the ground potential.

In stopping the application of the power supply voltage Vcc to the data communication apparatus 100, in order to decrease the common-mode potential at the cables 103 and 104 to the ground potential and thereby output a communication stop signal, it is sufficient that only the power-supply-voltage-drop detecting circuit 117 and the stop signal outputting circuit 118 are operable. That is to say, in decreasing the power supply voltage Vcc, power supply is unnecessary and no problem arises even if the other circuits are inoperable so long as these circuits 117 and 118 are operable until the communication stop signal is output.

Figure 3:
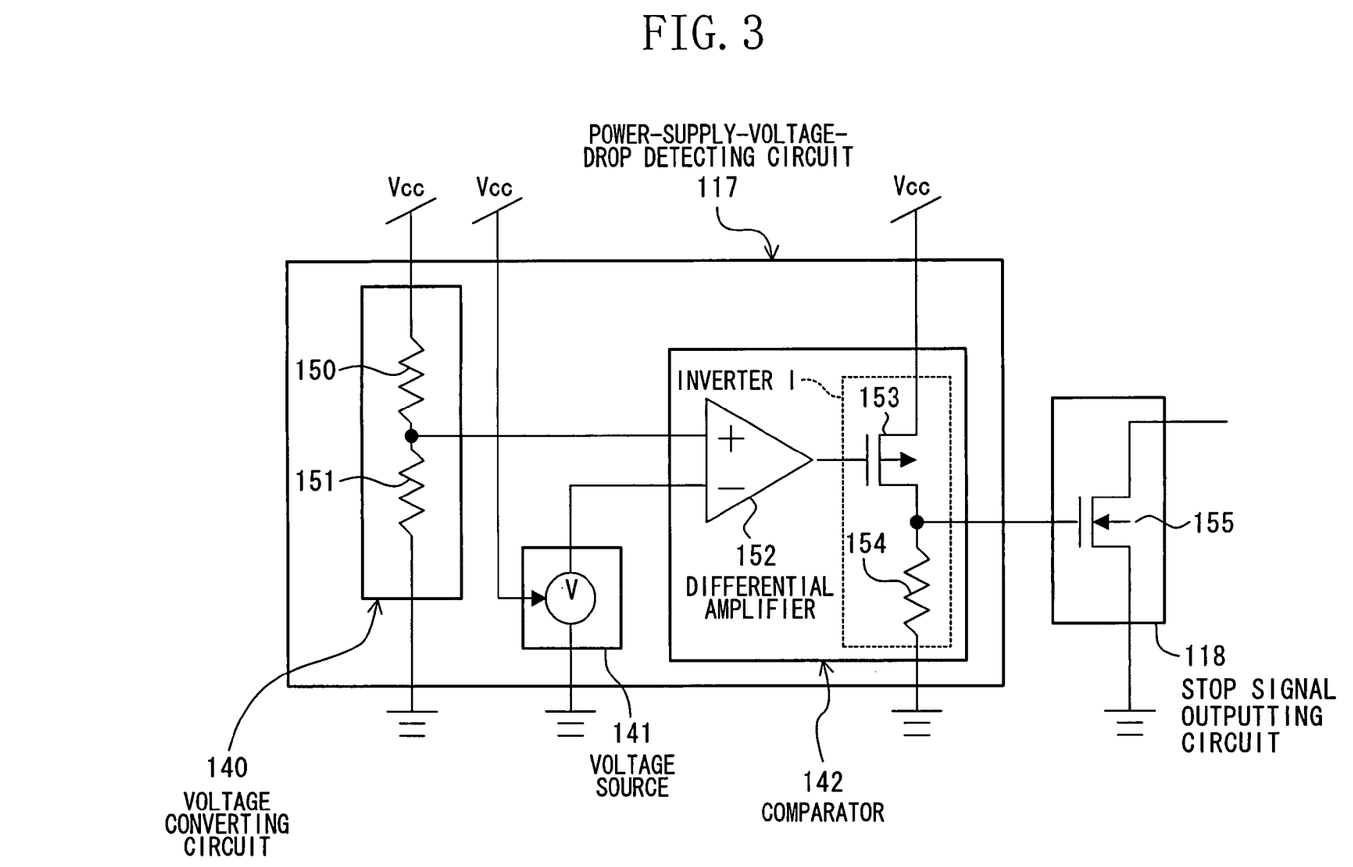
FIG. 3 is a diagram showing inner configurations of the power-supply-voltage-drop detecting circuit and the stop signal outputting circuit in detail.

Next, FIG. 3 shows specific internal configurations of the power-supply-voltage-drop detecting circuit 117 and the stop signal outputting circuit 118. In FIG. 3, in the power-supply-voltage-drop detecting circuit 117, the voltage converting circuit 140 is constituted by two resistances 150 and 151 connected in series. The comparator 142 is constituted by a differential amplifier 152 and an inverter I. If the output voltage of the voltage converting circuit 140 is higher than that of the voltage source 141, the differential amplifier 152 outputs a High signal, while outputting a Low signal if the output voltage of the voltage converting circuit 140 is lower than that of the voltage source 141. The inverter I is constituted by serially connected circuits, i.e., a p-type MOS transistor 153 receiving an output from the differential amplifier 152 at its gate and a resistance 154 having a high resistance value. The serially connected circuits are placed between the power supply voltage Vcc and the ground. A connecting point between the PMOS transistor 153 and the resistance 154 in the inverter I is output to the stop signal outputting circuit 118 as an output node of the comparator 142. The stop signal outputting circuit 118 is constituted by an n-type MOS transistor 155 whose gate is connected to the output node of the comparator 142, whose source is grounded and whose drain is connected to the cables 103 and 104 in common.

Accordingly, the power-supply-voltage-drop detecting circuit 117 has two output voltages of High and Low. More specifically, the power-supply-voltage-drop detecting circuit 117 outputs a High signal when detecting a drop in the power supply voltage Vcc, while outputting a Low signal when detecting the succession of application of the power supply voltage Vcc. Upon receiving the High signal in detecting the drop in the power supply voltage Vcc, the NMOS transistor 155 decreases the common-mode potential to the ground potential.

Figure 4:
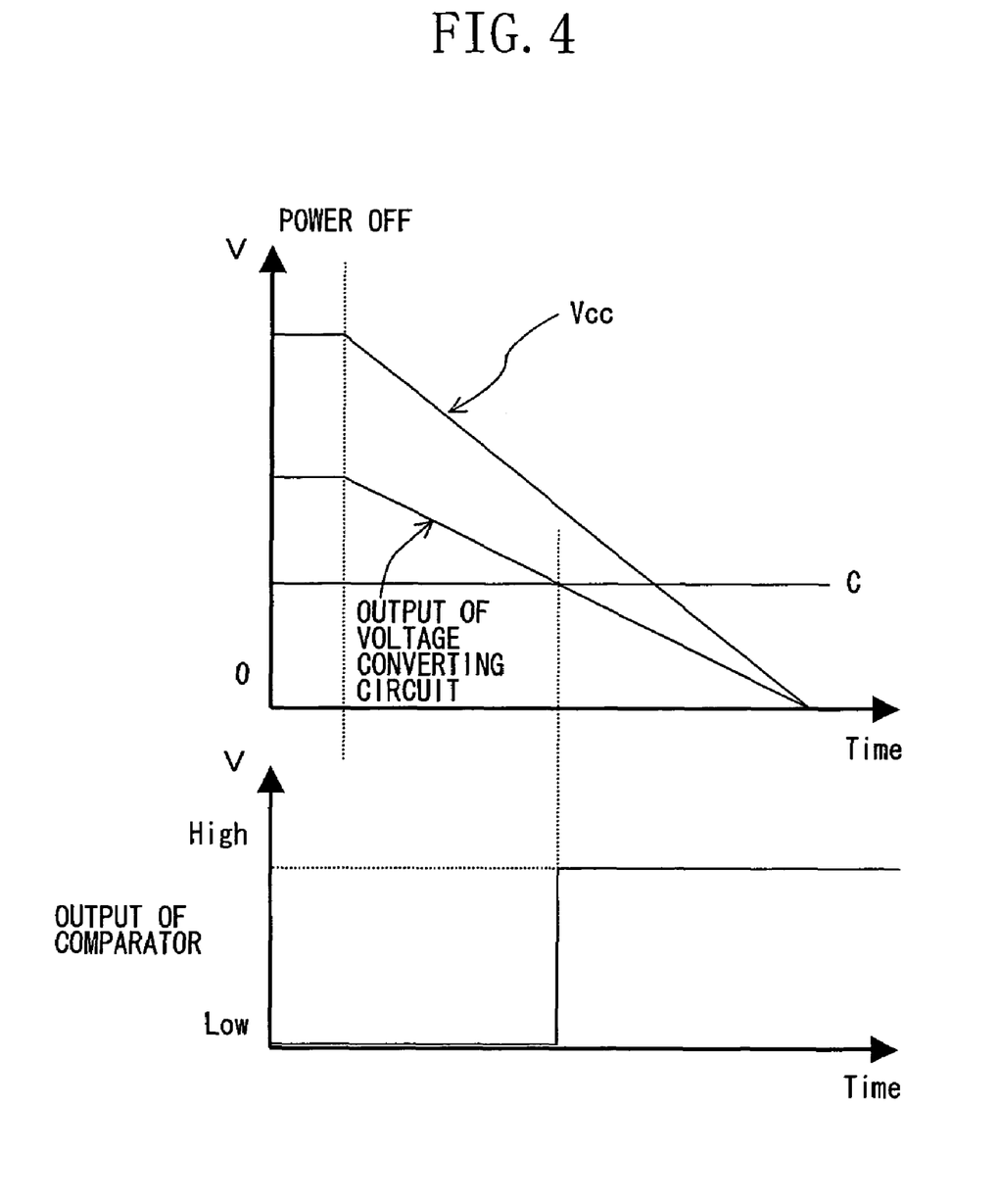
FIG. 4 is graphs for describing how the power-supply-voltage-drop detecting circuit operates.

FIG. 4 shows shifts of potentials indicating how the power-supply-voltage-drop detecting circuit 117 and the stop signal outputting circuit 118 operate. In FIG. 4, reference character C denotes a constant output voltage of the voltage source 141. Before the application of the power supply voltage Vcc is stopped, the output voltage of the voltage converting circuit 140 is higher than the output voltage C of the voltage source 141, and thus the output signal of the comparator 142 is at the Low level. Accordingly, the NMOS transistor 155 is in an OFF state, and the potential is not decreased to the ground potential. When the application of the power supply voltage Vcc is stopped and the power supply voltage Vcc drops, the magnitude relationship in output voltage between the voltage converting circuit 140 and the voltage source 141 is reversed so that the output of the comparator 142 comes to the High level. Accordingly, the NMOS transistor 155 turns ON, so that the common-mode potential at the cables 103 and 104 is decreased to the ground potential.

In this case, the inverter I constituted by the PMOS transistor 153 and the resistance 154 having a high resistance value is provided in the comparator 142 because of the following reasons. If the power supply voltage Vcc drops greatly due to a stop of the power supply, the voltage source 141 and the differential amplifier 152, for example, do not operate normally, so that the output of the differential amplifier 152 might be in a High state though this output should be at a Low level. Even in such a case, the resistance 154 with a high resistance value delays a drop in the output voltage of the comparator 142 from the H level to the L level, so that the NMOS transistor 155 is kept in the ON state for a long period, thereby keeping the decreased common-mode potential at the ground potential for a longer period.

In the stop signal outputting circuit 118, a capacitance may be provided between the node of the gate of the NMOS transistor 155 and the ground or the power source as a measure against the noise in the power supply voltage Vcc. However, the gate capacitance of the NMOS transistor 155 is made large because the common-mode potential needs to be decreased to the ground potential for a short period in this circuit. Accordingly, the gate capacitance can also serve as the capacitance described above.

The High state of the output of the comparator 142 in FIG. 4 is shown as a constant voltage in order to facilitate understanding. However, in actual operation, the output of the comparator 142 decreases as the power supply voltage Vcc drops. This is also applicable to the following description of the High state. In this embodiment, it has been assumed that the voltage source 141 outputs the constant voltage C and the output voltage of the voltage converting circuit 140 monotonously decreases in accordance with the drop in the power supply voltage Vcc. However, the present invention is not limited to this embodiment in the case where the power supply voltage Vcc drops greatly.

(Modified Example of Voltage Converting Circuit Provided in Power-Supply-Voltage-Drop Detecting Circuit)

Figure 5:
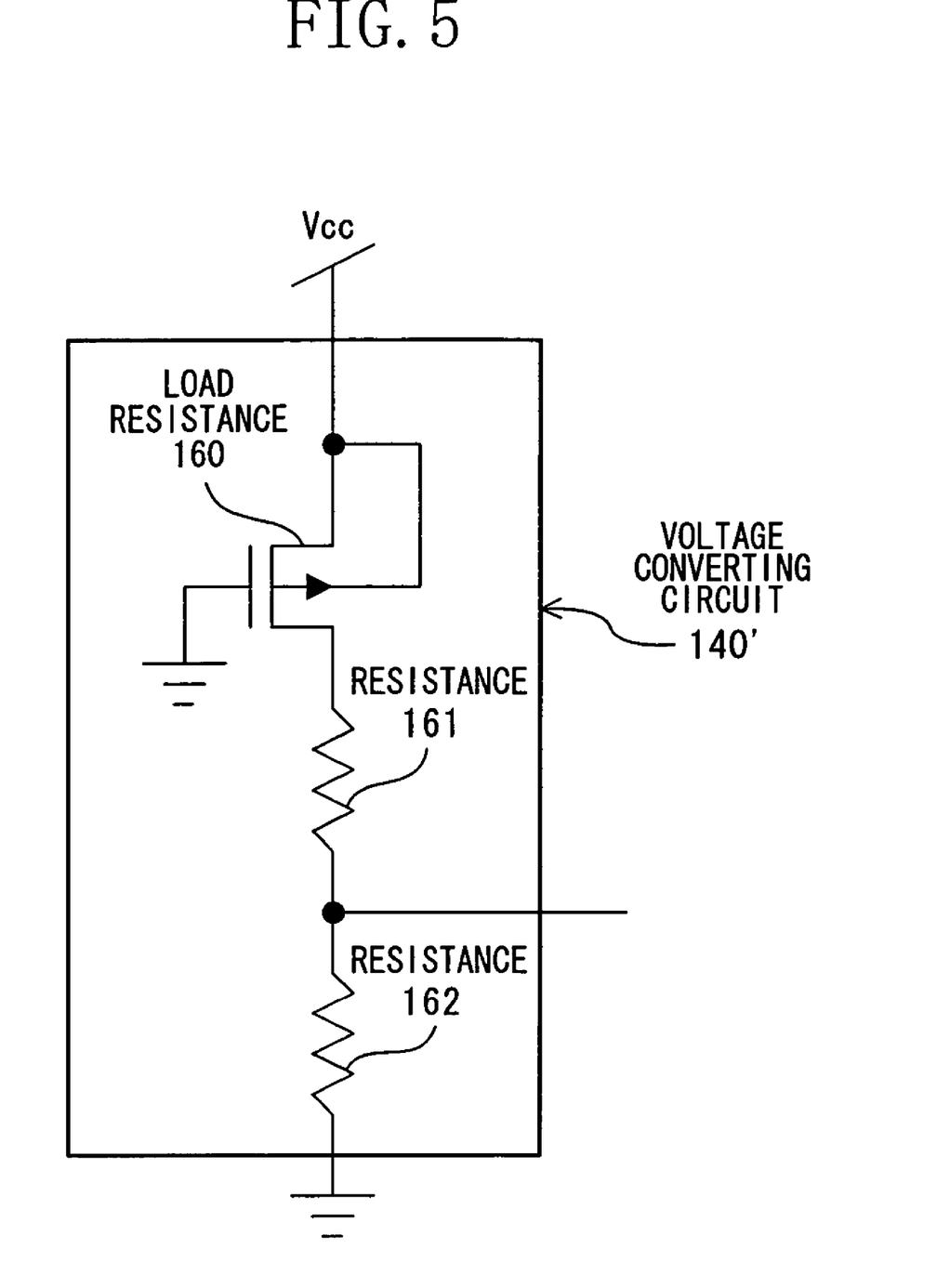
FIG. 5 is a diagram showing a modified example of an inner configuration of a voltage converting circuit provided in the power-supply-voltage-drop detecting circuit.

FIG. 5 shows a modified example of a voltage converting circuit provided in the power-supply-voltage-drop detecting circuit 117.

A voltage converting circuit 140' shown in FIG. 5 is constituted by serially connected circuits, i.e., a p-type MOS transistor 160 and two resistances 161 and 162. The PMOS transistor 160 is used as a load resistance which depends on the power supply voltage Vcc. The voltage converting circuit 140' is provided in consideration of the case where the voltage source 141 does not operate normally due to a drop in the power source voltage Vcc so that the output voltage of the voltage source 141, which should be a constant value C, decreases.

Figure 6:
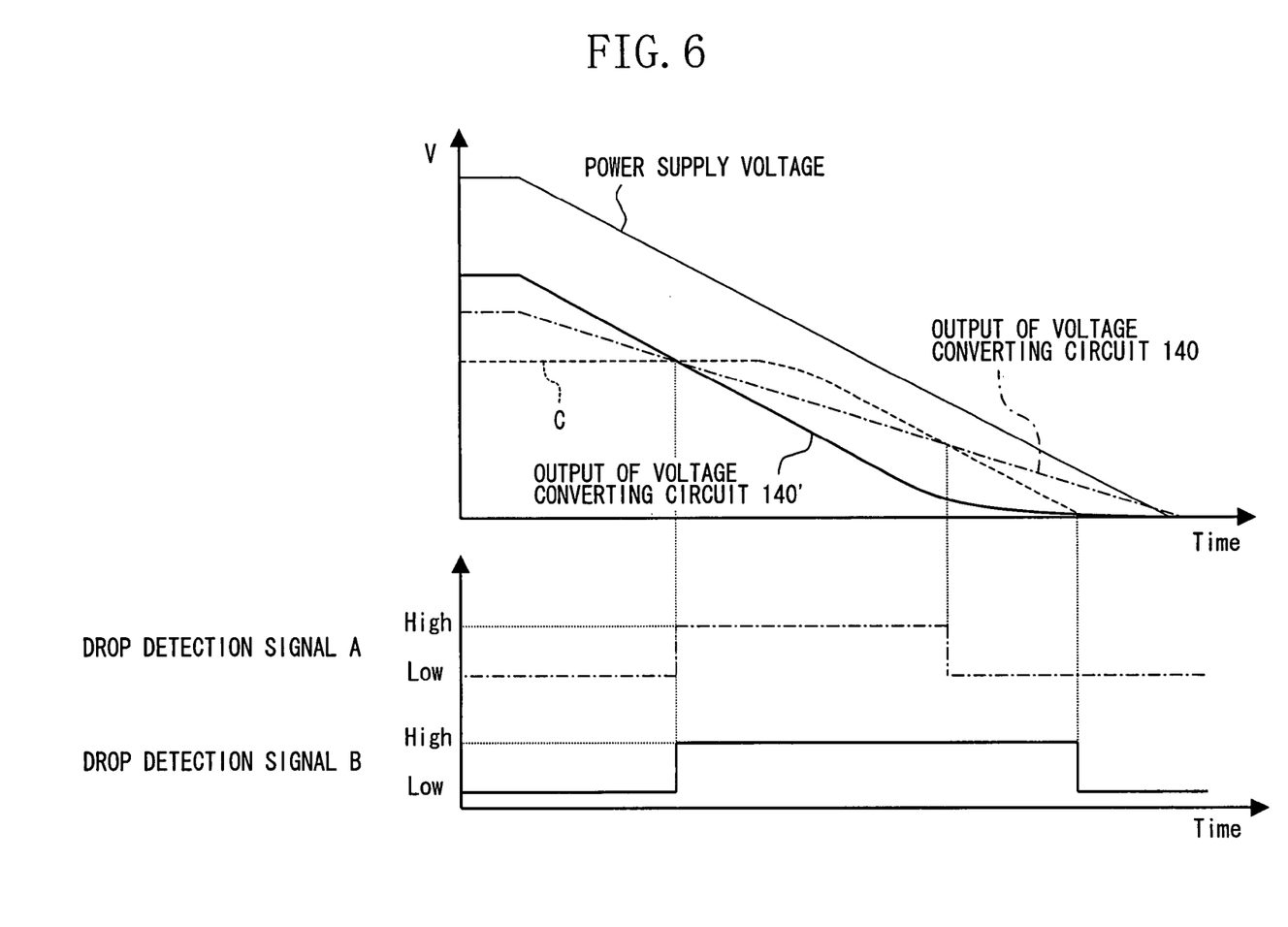
FIG. 6 is graphs for describing how the voltage converting circuit shown in FIG. 3 and the voltage converting circuit shown in FIG. 5 operate with a comparison between these circuits.

FIG. 6 is a diagram showing potential shifts with a comparison between operations of the voltage converting circuit 140' and the voltage converting circuit 140 shown in FIG. 3. A drop detection signal A represents an output signal from the power-supply-voltage-drop detecting circuit 117 with the voltage converting circuit 140, and a drop detection signal B represents an output signal from the power-supply-voltage-drop detecting circuit 117 with the voltage converting circuit 140'. As shown in FIG. 6, the usage of the voltage converting circuit 140' allows the drop detection signal (High signal) to be output for a longer period. The voltage converting circuit 140' can be readily implemented by combining some components out of a resistor, a transistor, a diode and a current source.

Figure 7:
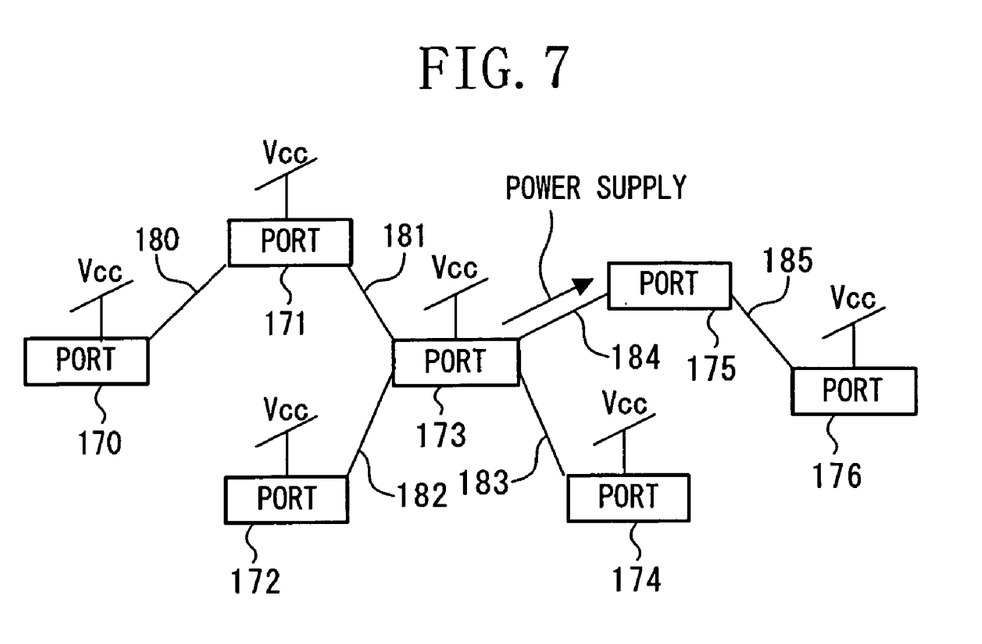
FIG. 7 is a diagram showing an example of a configuration of a communication network.

FIG. 7 shows an example of a network configuration for carrying out communication based on IEEE Std 1394a-2000.

In FIG. 7, reference numerals 170 through 176 denote PORTs of a serial interface based on IEEE Std 1394a-2000 embedded in electronic equipment including data communication apparatus according to the present invention. These PORTs 170 through 176 are connected to one another via cables 180 through 185. The cables based on IEEE Std 1394a-2000 are provided with a power source line, so that the PORT 175 having no source of a power supply voltage is supplied with power from the neighboring PORT 173 via the cable 184.

With respect to the network thus configured, operation when the application of the power supply voltage Vcc is stopped will be described.

For example, in the case where the application of the power supply voltage Vcc to the PORT 171 is stopped, the PORTs 170 and 173 are notified of a stop of communication via the cables 180 and 181, so that communication between the PORTs 170 and 171 and communication between the PORTs 171 and 173 are stopped.

Alternatively, in the case where the application of the power supply voltage Vcc to, for example, the PORT 173 is stopped, the power supply voltage Vcc at the port 175 supplied with the power supply voltage Vcc from the PORT 173 drops, so that the PORTs 173 and 175 output communication stop signals. In this manner, communication between the PORTs 171 and 173, communication between the PORTs 172 and 173, communication between the PORTs 173 and 174, communication between the PORTs 173 and 175 and communication between the PORTs 175 and 176 are stopped one after another.

As described above, when the application of the power supply voltage Vcc to, for example, the PORT 171 is stopped, the PORT 173 recognizes the stop of the application. On the other hand, when the application of the power supply voltage Vcc to the PORT 173 is stopped, the PORT 171 recognizes the stop of the application. That is to say, communication stop signals can be transmitted bilaterally. In addition, every data communication apparatus connected to data communication apparatus to which the application of a power supply voltage Vcc is stopped can stop communication of itself by recognizing a stop of communication in another piece of communication apparatus. Of course, such operation can be performed in the case where power supplies to a plurality of pieces of data communication apparatus on the network are stopped at the same time.

In the data communication apparatus 100 described above, only the power-supply-voltage-drop detecting circuit 117 and the stop signal outputting circuit 118 are added except for the functions specified in IEEE Std 1394a-2000, and the conventional common-mode-potential detecting circuit 124 is used to receive a communication stop signal. Accordingly, even if the other end of the communication is provided with none of the power-supply-voltage-drop detecting circuit 117 and stop signal outputting circuit 118, a communication stop signal can be transmitted to the other end of the communication so long as the data communication apparatus is based on IEEE Std 1394a-2000.

What is claimed is:

1. A data communication apparatus for data communication via cables, the apparatus comprising:
   a drop detecting circuit for detecting a drop in a power supply voltage supplied to the drop detecting circuit itself; and a stop signal outputting circuit for outputting a communication stop signal via the cable, in response to a drop detection signal output from the drop detecting circuit, wherein the drop detecting circuit includes:

a voltage converting circuit having an outputting voltage which varies depending on a drop in the power supply voltage; and a comparator for comparing a voltage variation signal output from the voltage converting circuit with a predetermined constant voltage value.

2. The data communication apparatus of claim 1, wherein when the drop detecting circuit detects a drop in the power supply voltage, a communication circuit embedded in the data communication apparatus for data communication stops the function of the communication circuit in response to the drop detection signal output from the voltage-drop detecting circuit.

3. The data communication apparatus of claim 1, including a common-mode-potential setting circuit for setting a common-mode potential of a differential signal at the cables, wherein the stop signal outputting circuit decreases the common-mode potential set by the common-mode-potential setting circuit to a ground potential, thereby outputting a communication stop signal.

4. The data communication apparatus of claim 1, wherein the voltage converting circuit includes:

a load circuit having a load resistance which varies depending on variation in the power supply voltage; and at least one resistance connected to the load circuit in series.

5. The data communication apparatus of claim 1, wherein the comparator includes:

a differential amplifier for receiving the voltage variation signal output from the voltage converting circuit and a predetermined constant voltage value signal; and an inverter for receiving an output from the differential amplifier and inverting the output, and the inverter includes:

a p-type transistor for receiving the output from the differential amplifier; and a resistance connected to the p-type transistor in series and having a high resistance value.

6. A data communication method for data communication via cables, the method comprising the steps of:

detecting a drop in a power supply voltage applied, thereby detecting a stop of the application of the power supply voltage; and decreasing a potential at the cables when detecting the stop of the application of the power supply voltage, thereby outputting a communication stop signal, wherein the step of detecting a drop in a power supply voltage applied further comprises:

outputting, via a voltage converting circuit, a voltage which varies depending on the drop in the power supply voltage; and comparing a voltage variation signal output from the voltage converting circuit with a predetermined constant voltage.

* * * * *